(12) United States Patent
Cho et al.

(10) Patent No.: US 11,603,427 B2
(45) Date of Patent: Mar. 14, 2023

(54) RESIN COMPOSITION

(71) Applicant: LG Chem, Ltd., Seoul (KR)

(72) Inventors: Yoon Gyung Cho, Daejeon (KR); Se Woo Yang, Daejeon (KR); Yang Gu Kang, Daejeon (KR); Eun Suk Park, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd.

( * ) Notice: Subject to any disclaimer, the term of this patent is extended or adjusted under 35 U.S.C. 154(b) by 331 days.

(21) Appl. No.: 16/645,897

(22) PCT Filed: Mar. 19, 2019

(86) PCT No.: PCT/KR2019/003150
§ 371 (c)(1),
(2) Date: Mar. 10, 2020

(87) PCT Pub. No.: WO2019/190106
PCT Pub. Date: Oct. 3, 2019

(65) Prior Publication Data
US 2020/0277433 A1    Sep. 3, 2020

(30) Foreign Application Priority Data

Mar. 28, 2018 (KR) .................. 10-2018-0035749
Mar. 14, 2019 (KR) .................. 10-2019-0029277

(51) Int. Cl.
*H01M 50/20* (2021.01)
*C08K 3/14* (2006.01)
(Continued)

(52) U.S. Cl.
CPC .......... *C08G 18/4277* (2013.01); *B60L 50/64* (2019.02); *C08G 18/79* (2013.01);
(Continued)

(58) Field of Classification Search
CPC ................ C08G 18/4277; C08G 18/79; C08G 18/792; B60L 50/64; H01M 50/20;
(Continued)

(56) References Cited

U.S. PATENT DOCUMENTS

2004/0112631 A1* 6/2004 Gotoh .................... H05K 3/305
174/250
2004/0214978 A1   10/2004 Rosin et al.
(Continued)

FOREIGN PATENT DOCUMENTS

CN    1360815 A    7/2002
CN    1550535 A    12/2004
(Continued)

OTHER PUBLICATIONS

JP H07033477 MT (Year: 1995).*
(Continued)

*Primary Examiner* — Alexander Usyatinsky
(74) *Attorney, Agent, or Firm* — Lerner, David, Littenberg, Krumholz & Mentlik, LLP

(57) ABSTRACT

The present application relates to a composition, a battery module and a battery pack. According to one example of the present application, the related manufacturing process can be improved and a battery module having excellent insulation can be provided.

16 Claims, 7 Drawing Sheets

(51) Int. Cl.
- *C08G 18/42* (2006.01)
- *B60L 50/64* (2019.01)
- *C08G 18/79* (2006.01)
- *C08K 3/22* (2006.01)
- *C08L 83/04* (2006.01)
- C08K 3/28 (2006.01)
- C08K 3/38 (2006.01)

(52) U.S. Cl.
CPC .............. *C08G 18/792* (2013.01); *C08K 3/14* (2013.01); *C08K 3/22* (2013.01); *C08L 83/04* (2013.01); *H01M 50/20* (2021.01); C08K 2003/2227 (2013.01); C08K 2003/282 (2013.01); C08K 2003/385 (2013.01); C08L 2205/025 (2013.01); C08L 2205/03 (2013.01); C08L 2314/06 (2013.01); H01M 2220/20 (2013.01)

(58) Field of Classification Search
CPC ....... H01M 2220/20; C08K 3/14; C08K 3/22; C08K 2003/2227; C08K 2003/282; C08K 2003/385; C08L 2205/025; C08L 2205/03; C08L 2314/06
See application file for complete search history.

(56) References Cited

U.S. PATENT DOCUMENTS

| | | | |
|---|---|---|---|
| 2008/0276983 | A1 | 11/2008 | Drake et al. |
| 2009/0191448 | A1* | 7/2009 | Yamamoto ........... H01M 50/116 264/261 |
| 2014/0248497 | A1 | 9/2014 | Takei et al. |
| 2017/0369632 | A1 | 12/2017 | Pela et al. |
| 2018/0076493 | A1* | 3/2018 | Park ................. H01M 10/0525 |
| 2018/0183117 | A1 | 6/2018 | Cho et al. |
| 2019/0031603 | A1 | 1/2019 | Lee et al. |
| 2019/0036086 | A1 | 1/2019 | Ueda |

FOREIGN PATENT DOCUMENTS

| | | | |
|---|---|---|---|
| CN | 101548391 | A | 9/2009 |
| CN | 101692503 | A | 4/2010 |
| CN | 102569440 | A | 7/2012 |
| CN | 103339214 | A | 10/2013 |
| CN | 103858180 | A | 6/2014 |
| CN | 107353859 | A | 11/2017 |
| CN | 107431147 | A | 12/2017 |
| CN | 107735882 | A | 2/2018 |
| JP | S64006055 | A | 1/1989 |
| JP | H07033477 | * | 4/1995 |
| JP | H07033477 | B2 | 4/1995 |
| JP | 20120107153 | A | 6/2012 |
| JP | 5105308 | B2 | 12/2012 |
| JP | 2013053305 | A | 3/2013 |
| JP | 2014111686 | A | 6/2014 |
| JP | 2016124877 | A | 7/2016 |
| JP | 2019504916 | A | 2/2019 |
| KR | 101093528 | B1 | 12/2011 |
| KR | 20140039111 | A | 4/2014 |
| KR | 20160105358 | A | 9/2016 |
| KR | 1020160105358 | * | 9/2016 |
| KR | 20170130462 | A | 11/2017 |
| WO | 2016137303 | A1 | 9/2016 |
| WO | 2017142071 | A1 | 8/2017 |
| WO | 2017171490 | A2 | 10/2017 |

OTHER PUBLICATIONS

Beuhler A. et al. PCI Magazine. Apr. 4, 2016 (Year: 2016).*
The decision of JPO to grant a Patent for Application No. 2020513283 (Year: 2021).*
The decision of EPO to grant a Patent for Application No. 19778216. 2-1102/3686230 (Year: 2022).*
The Notification of SIPO to grant a Patent for Application No. 201980004708.5 (Year: 2022).*
Beuhler, et al., Novel Polyurethanes from Biorenewable C18 Polyols, PCI Magazine, Apr. 2016, pp. 1-10.
International Search Report for Application No. PCT/KR2019/ 0031505, dated Jun. 26, 2019, pp. 1-3.
Chinese Search Report for Application No. 201980004708.5 dated Jul. 22, 2021, 5 Pages.
Dong-Ming, S. et al., "Development State of Adhesives for Batteries" May 2003, 2 Pages, China Academic Journal. (Providing English Translation of Abstract only).
Zhu, C.L. et al., "Waterborne Polyurethane Used as Binders for Lithium-Ion Battery with Improved Electrochemical Properties" Advanced Materials Research, Feb. 2015, 2 Pages, vol. 1090. (Abstract Only).
Extended European Search Report including Written Opinion for Application No. 19778216.2 dated Apr. 12, 2021, pp. 1-7.

* cited by examiner

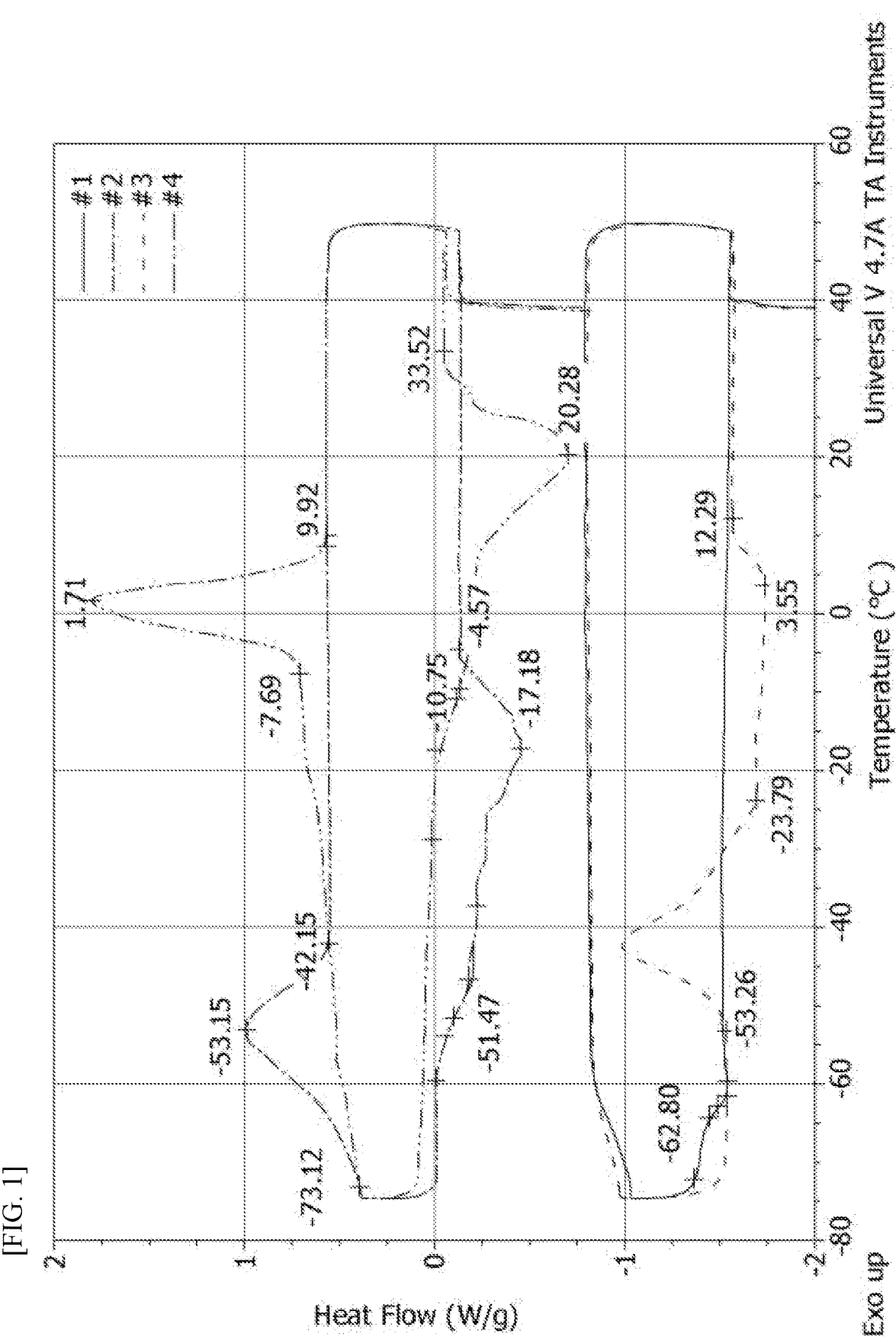
[FIG. 1]

[FIG. 2]
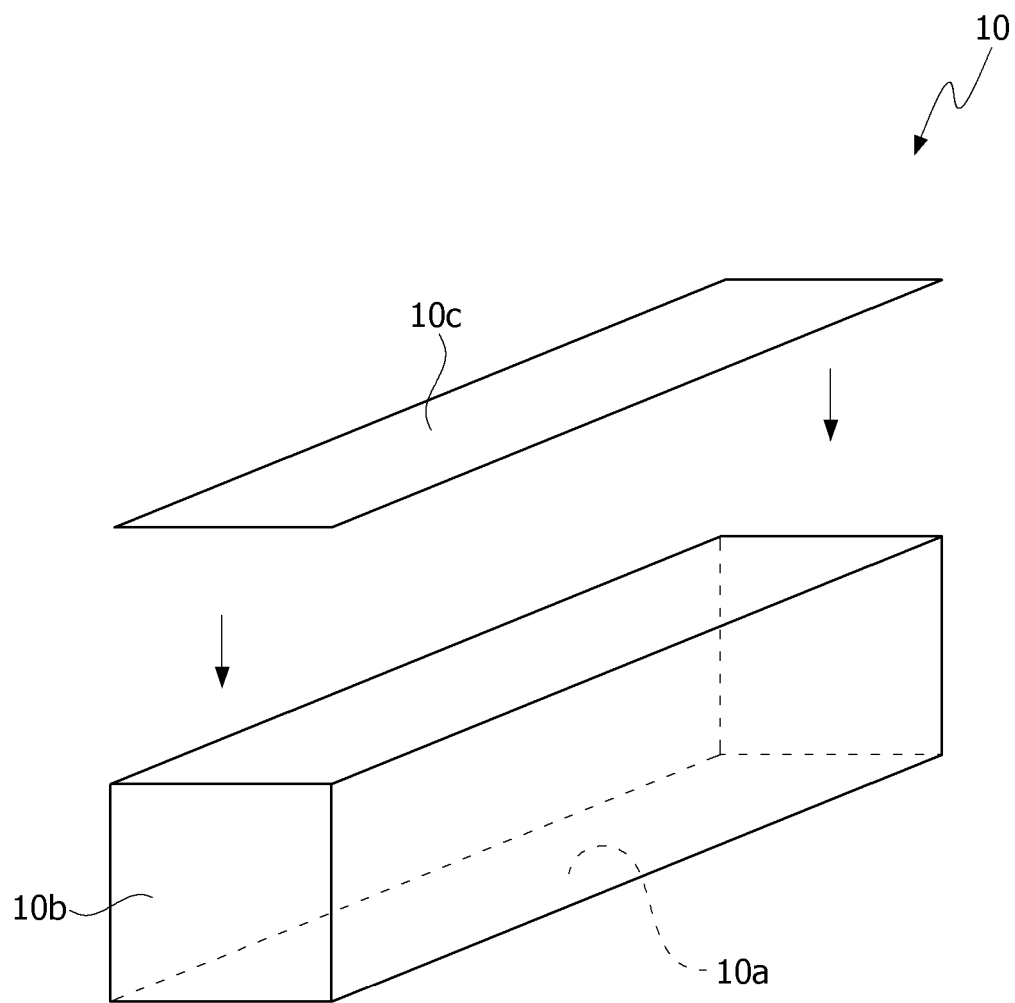

[FIG. 3]
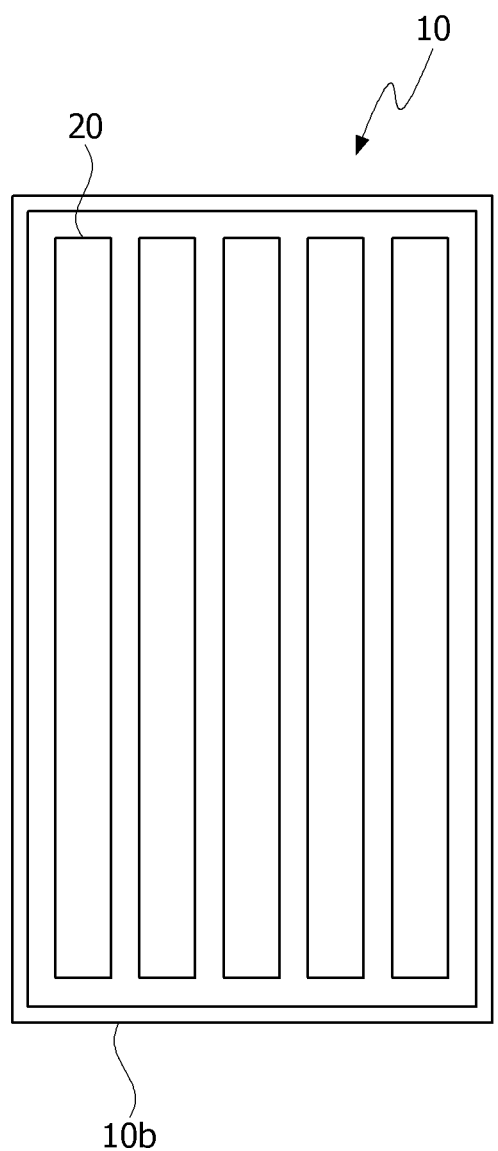

[FIG. 4]
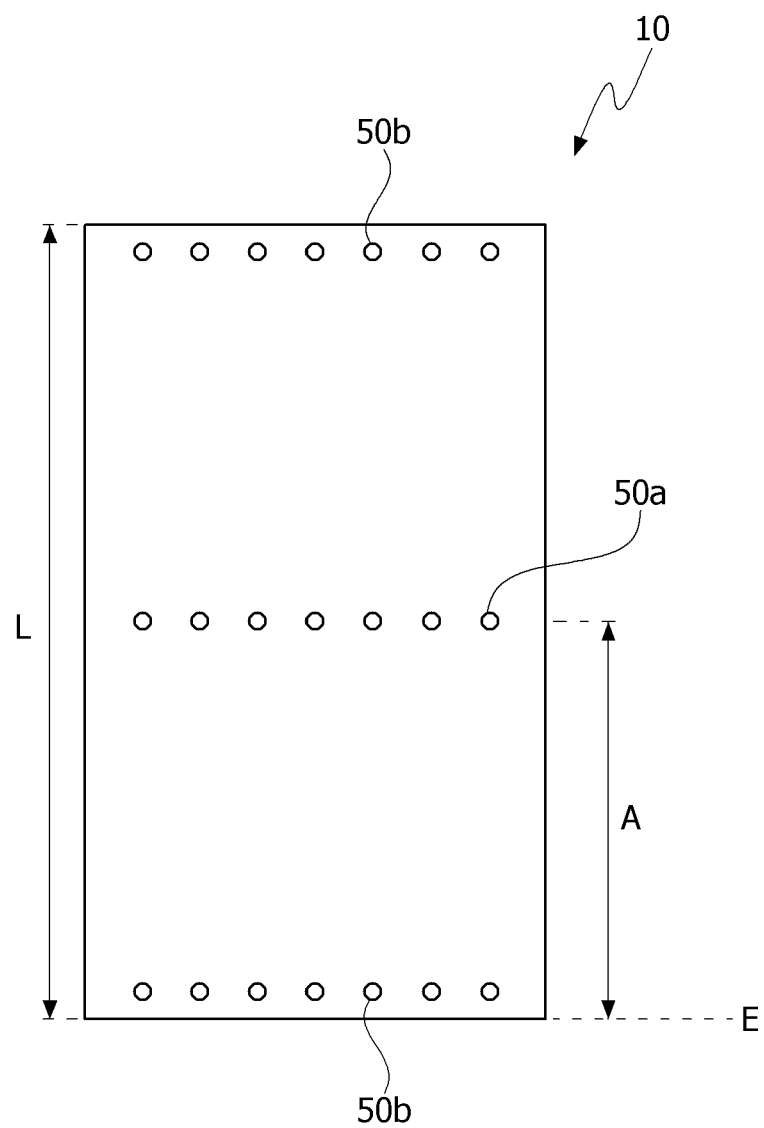

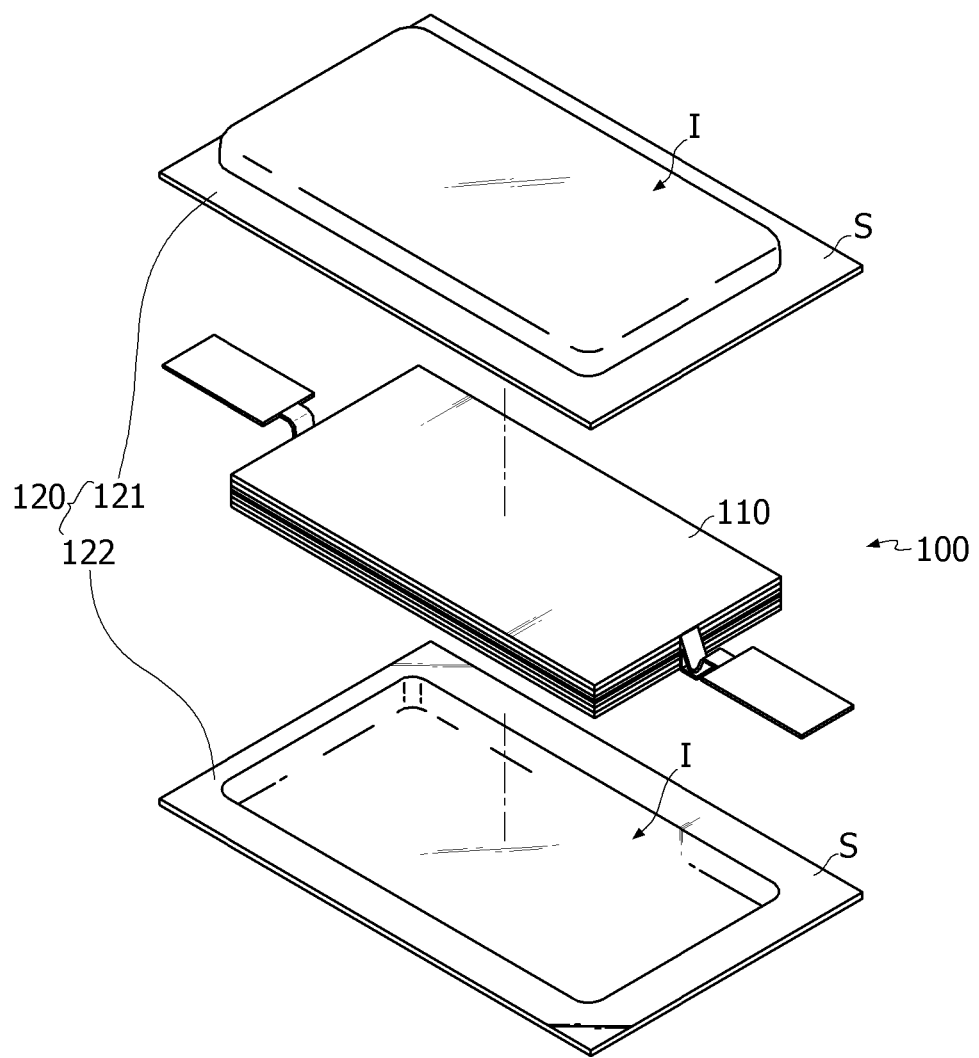
[FIG. 5]

[FIG. 6]
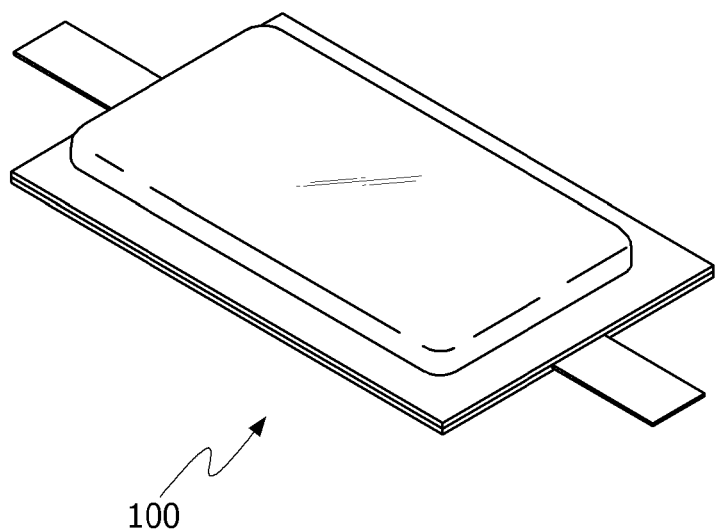
[FIG. 7]
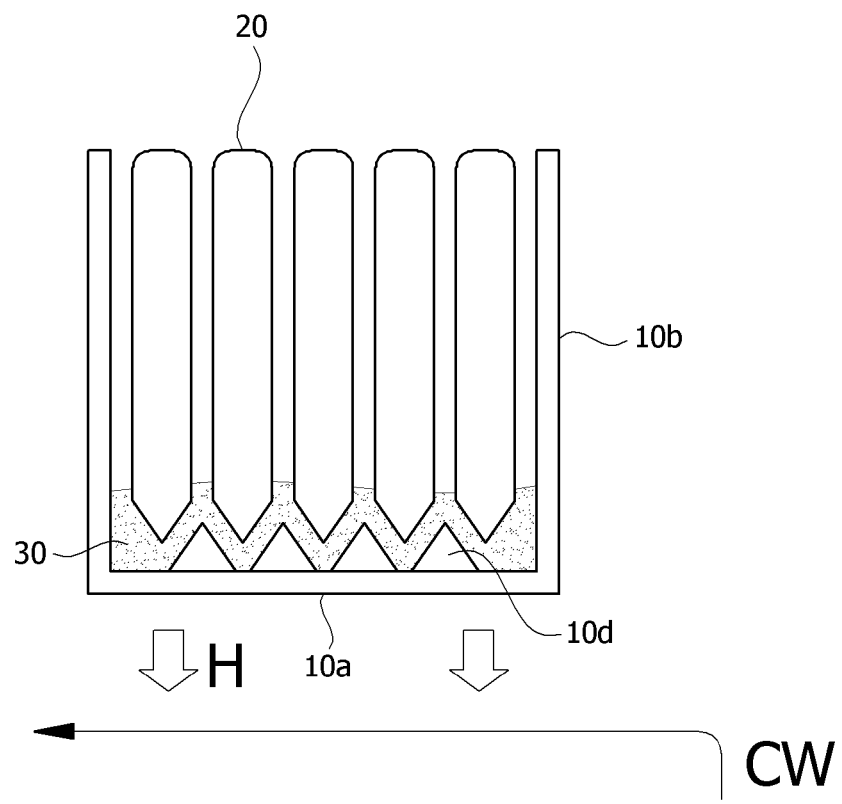

[FIG. 8]
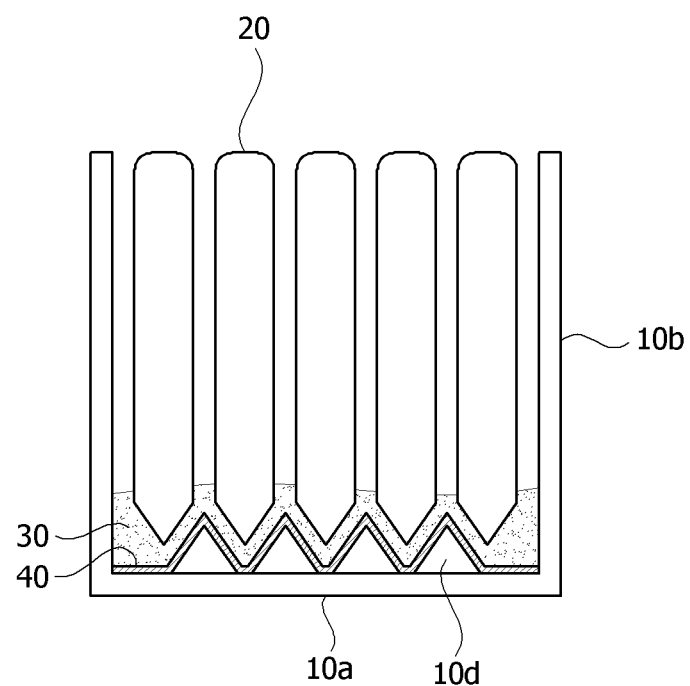

RESIN COMPOSITION

CROSS-REFERENCE TO RELATED APPLICATIONS

This application is a national phase entry under 35 U.S.C. § 371 of International Application No. PCT/KR2019/003150 filed Mar. 19, 2019, which claims priority from Korean Patent Application Nos. 10-2018-0035749 filed Mar. 28, 2018, and 10-2019-0029277 filed Mar. 14, 2019, all of which are incorporated herein by reference.

TECHNICAL FIELD

The present application relates to a resin composition. Specifically, the present application relates to a resin composition, a battery module comprising a cured product of the resin composition, a battery pack, and an automobile.

BACKGROUND ART

A secondary battery includes a nickel cadmium battery, a nickel hydride battery, a nickel zinc battery, or a lithium secondary battery, and the like, where a typical example thereof is a lithium secondary battery.

The lithium secondary battery mainly uses lithium oxides and carbon materials as positive electrode and negative electrode active materials, respectively. The lithium secondary battery includes an electrode assembly in which a positive plate and a negative plate coated with a positive electrode active material and a negative electrode active material, respectively, are disposed with a separator interposed therebetween, and an exterior material in which the electrode assembly is sealed and housed together with an electrolyte, which can be classified as a can type secondary battery and a pouch type secondary battery depending on the kind of the exterior material. Such a single secondary battery can be referred to as a battery cell.

In the case of medium and large devices such as automobiles or power storage systems, in order to increase capacity and power, a battery module in which a large number of battery cells are electrically connected to each other may be used or a battery pack in which a plurality of such battery modules are connected may be used.

One of methods of constructing the battery module or the battery pack as above is to use an adhesive material capable of fixing a plurality of battery cells inside the battery module. At this time, the adhesive material can be injected into the battery module through an injection hole formed on the surface of the battery module.

DISCLOSURE

Technical Problem

It is one object of the present application to improve injection processability of an adhesive composition that can be used to fix a battery cell in a battery module.

It is another object of the present application to provide a composition which can provide excellent insulating property, adhesive force, exothermic property, and the like, after being injected into a battery module and cured.

It is another object of the present application to provide a battery module and a battery pack.

The above and other objects of the present application can be all solved by the present application, which is described in detail below.

Technical Solution

In one example of the present application, the present application relates to a curable resin composition for use in a battery module or a battery pack. Specifically, the composition of the present application may be a composition which is injected into the case of a battery module, and is in contact with one or more battery cells present in the battery module and used to fix the battery cells in the battery module after curing, as described below. Accordingly, the resin composition may comprise a main component, and may comprise a curing agent component that curing may be performed when mixed with the main component. In addition, the resin composition may contain a filler, as described below.

With respect to the use of the resin composition, injection into the module is not easy when the curing rate of the resin composition, that is, the adhesive composition is so fast that increases the viscosity. On the other hand, when the injected liquid adhesive is not sufficiently cured, it has a low viscosity, so that when the operation of moving the module or inverting the module depending on additional processes is followed, the adhesive may leak or the components may be contaminated, and the interface between the parts, which have been intended to be bonded through the adhesive, may be lifted. In consideration of these points, the inventors of the present application have developed a resin composition which has excellent processability because it has a certain level of curing rate and is capable of preventing contamination or peeling between components which may occur due to an adhesive in a battery module manufacturing process.

Accordingly, the resin composition of the present application can have curing characteristics at the following rate. In the present application, the curing rate of the resin composition can be expressed as a viscosity change with time.

The composition may be a composition satisfying an initial viscosity change ratio defined by the following relational expression 1 in a range of 1.1 to 5.0.

Initial viscosity change ratio=$V_2/V_1$     [Relational Expression 1]

In Relational Expression 1 above, $V_1$ is an initial viscosity, which is a viscosity value as measured at room temperature within 60 seconds after mixing components of the resin composition, that is, a main agent and a curing agent, and $V_2$ is a viscosity value measured after leaving the resin composition, in which $V_1$ has been measured, at room temperature for 5 minutes. When $V_1$ and $V_2$ are measured in a shear rate range of 0.01 to 10.0/s using a rheological property measuring device (ARES), they are viscosity values measured at a point of 2.5/s. In the present application, the term "room temperature" is a state without particularly warming or cooling, which may mean any temperature within the range of about 10 to 30° C., such as a temperature of about 15° C. or higher, 18° C. or higher, 20° C. or higher, or about 23° C. or higher and about 27° C. or lower.

As described above, the fact that the viscosity change ratio expressed by Relational Expression 1 is satisfied means that the viscosity of the liquid adhesive composition injected at the beginning of the operation for forming the battery module is maintained at a relatively low level. As a result, a sufficient process load ratio can be ensured.

In addition, the composition may be a composition satisfying an initial viscosity change ratio of 10 or more as defined by the following relational expression 2.

Initial viscosity change ratio=$V_3/V_1$     [Relational Expression 2]

In Relational Expression 2 above, $V_1$ is an initial viscosity, which is a viscosity value as measured at room temperature within 60 seconds after mixing components of the resin composition, that is, main agent and curing agent components, and $V_3$ is a viscosity value measured after leaving the resin composition, in which $V_1$ has been measured, at room temperature for 60 minutes. When $V_1$ and $V_3$ are measured in a shear rate range of 0.01 to 10.0/s using a rheological property measuring device (ARES), they are viscosity values measured at a point of 2.5/s.

As described above, the fact that the viscosity change ratio represented by Relational Expression 2 is satisfied means that after 60 minutes from the injection into the battery module, the injected composition can be cured to a certain degree to fix the battery cell inside the module case, and it is possible to prevent contamination of adjacent parts and lifting between part interfaces even when moving or inverting the module.

In the present application, $V_1$, $V_2$, and $V_3$ may be referred to as a temporary curing viscosity value. In the present application, the temporary curing may mean that the resin composition does not reach a real curing state, where the real curing state means a state that in order to manufacture a battery module, the material injected into the module can be regarded as having been cured enough to function as an adhesive imparted with a function such as actual heat dissipation. Taking a urethane resin as an example, the real curing state can be confirmed from the fact that a conversion rate based on the NCO peak around 2250 cm$^{-1}$ is 80% or more, which is determined by a FT-IR analysis on the basis of the curing at room temperature and 30 to 70% relative humidity for 24 hours.

In one example, the value of $V_1$ of the resin composition may be 500,000 cP or less. The lower limit can be, for example, 100,000 cP or more. When the relevant range is satisfied, it is advantageous to satisfy Relational Expressions 1 and 2 above, thereby being capable of ensuring appropriate processability.

In one example, the value of $V_2$ of the resin composition may be 2,000,000 cP or less. The fact that the relevant range is satisfied means that even though the curing reaction occurs after the components of a two-component resin composition as described below are mixed, proper flowability is still present in the composition. When the value of $V_2$ is satisfied, it is advantageous to satisfy the above-described Relational Expression 1, thereby being capable of ensuring appropriate processability.

In another example, the value of $V_3$ of the resin composition may be 5,000,000 cP or more. The fact that the relevant range is satisfied means that while the curing reaction occurs sufficiently for the usual time that the components of the two-component resin composition are mixed and then expected to be capable of being injected into the battery module, the flowability of the composition is weakened, which can fix the battery cell sufficiently. When the value of $V_3$ is satisfied, it is advantageous to satisfy the above-described Relational Expression 2, thereby being capable of ensuring proper processability and product durability.

It is also possible to additionally take a predetermined measure so as to shorten the time for which the viscosity value corresponding to $V_3$ in Relational Expression 2 above is achieved, on the premise that Relational Expression 1 above is satisfied, if necessary. For example, a viscosity value corresponding to $V_3$ may also be obtained faster by warming or heating the composition at a level that does not adversely affect battery module components.

The type of the resin composition is not particularly limited so long as it satisfies the curing rate characteristics associated with the prescribed viscosity and has adhesiveness suitable for its application after curing.

In one example, a room temperature curing composition may be used as the resin composition. The room temperature curing composition means a composition having a system capable of exhibiting a predetermined adhesive ability through a curing reaction at room temperature, which may be, for example, a two-component silicone-based resin composition, a two-component urethane-based resin composition, a two-component epoxy resin composition or a two-component acrylic resin composition.

In one example, the resin composition can provide excellent electrical insulation after curing (real curing). In the battery module structure as described below, when the resin layer exhibits electrical insulation, the performance of the battery module can be maintained and stability can be ensured. For example, when a dielectric breakdown voltage of the cured product is measured 24 hours after mixing the components of the resin composition, that is, the main agent and the curing agent, the dielectric breakdown voltage may be about 10 kV/mm or more, 15 kV/mm or more, or about 20 kV/mm or more. The higher the value of the dielectric breakdown voltage is, the resin layer shows more excellent insulation, and thus the upper limit is not particularly limited, but may be about 50 kV/mm or less, 45 kV/mm or less, 40 kV/mm or less, 35 kV/mm or less, or about 30 kV/mm or less in consideration of composition of the resin layer or the like. The dielectric breakdown voltage can be measured in accordance with ASTM D149, as described in the following examples. The dielectric breakdown voltage in the above range can be ensured by adjusting, for example, the filler or the resin component used in the resin composition, or the content thereof.

In one example, the composition may be a two-component urethane-based composition. The two-component urethane means polyurethane formed by mixing an isocyanate-based compound and a polyol-based compound, which is distinguished from one-component polyurethane having urethane groups in a single composition. When the two-component urethane-based composition is used, the composition may have the following constitutions. In the case of the two-component polyurethane, a main agent comprising a polyol and the like and a curing agent comprising an isocyanate and the like may react at room temperature and be cured. The curing reaction may be assisted by a catalyst such as, for example, dibutyltin dilaurate (DBTDL). Accordingly, the two-component urethane-based composition may comprise a physical mixture of a main component (polyol) and a curing agent component (isocyanate), and/or may comprise a reactant (cured product) of the main component and the curing agent component.

The two-component urethane-based composition may comprise a main composition part (or main part) containing at least a polyol resin and a curing agent composition part (or curing agent part) containing at least a polyisocyanate. Accordingly, the cured product of the resin composition may comprise both the polyol-derived unit and the polyisocyanate-derived unit. At this time, the polyol-derived unit may be a unit which is formed by urethane-reacting the polyol with the polyisocyanate, and the polyisocyanate-derived unit may be a unit which is formed by urethane-reacting the polyisocyanate with the polyol.

The composition may also comprise a filler. For example, in order to ensure thixotropy as required in the process and/or to ensure heat dissipation (thermal conductivity)

within the battery module or the battery pack, the composition of the present application may comprise an excess of fillers, as described below. The details will be described in detail in the following related description.

In one example, an ester-based polyol resin may be used as the polyol resin contained in the main composition part. When the ester-based polyol is used, it is advantageous in securing excellent adhesion and adhesion reliability in the battery module after curing the resin composition.

In one example, as the ester-based polyol, for example, a carboxylic acid-based polyol or a caprolactone-based polyol may be used.

The carboxylic acid-based polyol can be formed by reacting components comprising a carboxylic acid and a polyol (e.g., diol or triol), and the caprolactone-based polyol can be formed by reacting components comprising a caprolactone and a polyol (e.g., diol or triol). At this time, the carboxylic acid may be a dicarboxylic acid.

In one example, the polyol may be a polyol represented by the following formula 1 or 2.

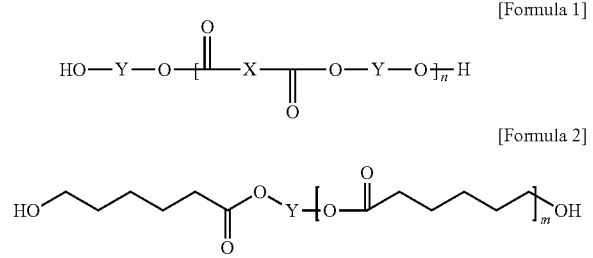

[Formula 1]

[Formula 2]

In Formulas 1 and 2, X is a carboxylic acid-derived unit, and Y is a polyol-derived unit. The polyol-derived unit may be, for example, a triol unit or a diol unit. In addition, n and m may be any number.

In Formula above, the carboxylic acid-derived unit is a unit formed by reacting a carboxylic acid with a polyol, and the polyol-derived unit is a unit formed by reacting a polyol with a carboxylic acid or caprolactone.

That is, when the hydroxyl group of the polyol and the carboxyl group of the carboxylic acid are reacted, the water ($H_2O$) molecule is eliminated by condensation reaction to form an ester bond, where after the carboxylic acid forms an ester bond by the condensation reaction, X in Formula 1 above means a moiety excluding the ester bond portion. In addition, after the polyol forms an ester bond by the condensation reaction, Y is a moiety excluding the ester bond. The ester bond is represented in Formula 1.

In addition, after the polyol forms an ester bond with caprolactone, Y in Formula 2 also represents a moiety excluding the ester bond. The ester bond is represented in Formula 2.

On the other hand, when the polyol-derived unit of Y in Formulas above is a unit derived from a polyol having three or more hydroxyl groups such as a triol unit, a branched structure may be realized in the Y part in the formula structure.

In Formula 1 above, the kind of the carboxylic acid-derived unit of X is not particularly limited, but in order to secure desired physical properties, it may be any one unit selected from the group consisting of a phthalic acid unit, an isophthalic acid unit, a terephthalic acid unit, a trimellitic acid unit, a tetrahydrophthalic acid unit, a hexahydrophthalic acid unit, a tetrachlorophthalic acid unit, an oxalic acid unit, an adipic acid unit, an azelaic acid unit, a sebacic acid unit, a succinic acid unit, a malic acid unit, a glutaric acid unit, a malonic acid unit, a pimelic acid unit, a suberic acid unit, a 2,2-dimethylsuccinic acid unit, a 3,3-dimethylglutaric acid unit, a 2,2-dimethylglutaric acid unit, a maleic acid unit, a fumaric acid unit, an itaconic acid unit and a fatty acid unit. From the viewpoint of a low glass transition temperature in the above-described range, an aliphatic carboxylic acid-derived unit may be preferable to an aromatic carboxylic acid-derived unit.

On the other hand, in Formulas 1 and 2, the kind of the polyol-derived unit of Y is not particularly limited, but in order to secure desired physical properties, it may be one or more selected from the group consisting of an ethylene glycol unit, a diethylene glycol unit, a propylene glycol unit, a 1,2-butylene glycol unit, a 2,3-butylene glycol unit, a 1,3-propanediol unit, a 1,3-butanediol unit, a 1,4-butanediol unit, a 1,6-hexanediol unit, a neopentyl glycol unit, a 1,2-ethylhexyldiol unit, a 1,5-pentanediol unit, a 1,9-nonanediol unit, a 1,10-decanediol unit, a 1,3-cyclohexanedimethanol unit, a 1,4-cyclohexanedimethanol unit, a glycerin unit and a trimethylolpropane unit.

On the other hand, in Formula 1 above, n is any number, and the range may be selected in consideration of the desired physical properties of the resin composition or a resin layer, which is the cured product thereof. For example, n may be about 2 to 10 or 2 to 5.

Also, in Formula 2 above, m is any number, and the range may be selected in consideration of the desired physical properties of the resin composition or a resin layer, which is the cured product thereof. For example, m is about 1 to 10 or 1 to 5.

If n and m in Formulas 1 and 2 are outside the above ranges, the crystallizability expression of the polyol becomes stronger, which may adversely affect the injection processability of the composition.

The molecular weight of the polyol may be adjusted in consideration of low-viscosity characteristics, durability or adhesion, and the like, as described below, which may be within a range of, for example, about 300 to 2,000. Unless otherwise specified, in this specification, the "molecular weight" may be a weight average molecular weight (Mw) measured using GPC (gel permeation chromatograph). If it is out of the above range, the reliability of the resin layer after curing may be poor and problems related to volatile components may occur.

In the present application, the polyisocyanate may mean a compound containing two or more isocyanate groups.

In the present application, the kind of the polyisocyanate contained in the curing agent composition part is not particularly limited, but in order to secure desired physical properties, a non-aromatic isocyanate compound containing no aromatic group can be used. That is, it may be advantageous to use an aliphatic or alicyclic series. When an aromatic polyisocyanate is used, the reaction rate may be too fast and the glass transition temperature of the cured product may be increased, so that it may be difficult to ensure the processability and physical properties suitable for the use of the composition of the present application.

For example, an aliphatic or aliphatic cyclic polyisocyanate or a modified product thereof may be used. Specifically, an aliphatic polyisocyanate such as hexamethylene diisocyanate, trimethylhexamethylene diisocyanate, lysine diisocyanate, norbornane diisocyanate, ethylene diisocyanate, propylene diisocyanate or tetramethylene diisocyanate; an aliphatic cyclic polyisocyanate such as transcyclohexane-1, 4-diisocyanate, isophorone diisocyanate, bis(isocyanatomethyl)cyclohexane diisocyanate or dicyclohexylmethane diisocyanate; or one or more carbodiimide-modified polyisocyanates or isocyanurate-modified polyisocyanates of the foregoing; and the like may be used. Also, a mixture of two or more of the above-listed compounds may be used.

The ratio of the polyol-derived resin component to the polyisocyanate-derived resin component in the resin composition is not particularly limited, which can be appropriately adjusted so that the urethane reaction between them can be performed.

As described above, an excess of fillers may be included in the composition, for securing heat dissipation (thermal conductivity) or thixotropy as required in the process, where if an excess of fillers is used, the viscosity of the composition increases, so that the processability at the time of injecting the composition into the case of the battery module may be deteriorated. Therefore, it requires low-viscosity properties sufficient to not interfere with the processability, while comprising an excess of fillers. In addition, when merely showing a low viscosity, it is also difficult to ensure the processability, so that it may be necessary that appropriate thixotropy is required, excellent adhesive force is exhibited when cured and the curing itself proceeds at room temperature. Then, the ester-based polyol is advantageous for securing the adhesion after curing, but is highly crystalline, so that there is a high possibility of becoming a wax state at room temperature and there is a disadvantage in securing proper injection processability due to viscosity increase. Even if it is used by lowering the viscosity through melting, the viscosity increase by crystallization in the injection or application process of the composition, which can be continued after mixing with fillers, occurs due to crystallizability occurring naturally in the storage process, and as a result, the processability may be lowered. In view of this point, the ester-based polyol used in the present application can satisfy the following characteristics.

In the present application, the ester-based polyol may be an amorphous or sufficiently low crystalline polyol. Here, the "amorphous" means a case where the crystallization temperature (Tc) and the melting temperature (Tm) are not observed in a DSC (differential scanning calorimetry) analysis. The DSC analysis can be performed using a known device, for example, Q2000 (TA instruments). Specifically, the DSC analysis can be performed at a rate of 10° C./minute within a range of −80° C. to 60° C., and for example, a method can be performed, in which the temperature is raised from 25° C. to 50° C. at the above rate, and then the temperature is reduced to −70° C. and raised to 50° C. again. Here, the "sufficiently low crystalline" means a case where the melting point or melting temperature (Tm) observed in the DSC analysis is less than 15° C., which is about 10° C. or lower, 5° C. or lower, 0° C. or lower, −5° C. or lower, −10° C. or lower, or −20° C. or lower or so. At this time, the lower limit of the melting point is not particularly limited, but for example, the melting point may be about −80° C. or higher, about −75° C. or higher, or about −70° C. or higher. When the polyol is crystalline or has high (room temperature) crystallizability, such as not satisfying the melting point range, the viscosity difference depending on the temperature easily increases, so that in the process of mixing the filler and the resin, the dispersion degree of the filler and the viscosity of the final mixture may be adversely affected, the processability is lowered, and as a result, it may become difficult to satisfy the cold resistance, the heat resistance and the water resistance required in the adhesive composition for a battery module.

FIG. 1 is a graph showing the results of DSC analysis of several polyols as an example for determining the amorphous characteristic or the sufficiently low crystallizability characteristic of the ester-based polyol. According to the present application, Sample #1 can be determined to be amorphous and Samples #2 and #3 can be determined to be sufficiently low crystalline. On the other hand, in the case of Sample #4 having a melting temperature (Tm) of 33.52° C., it can be said that the crystallizability is high.

The polyol resin and isocyanate components contained in the urethane-based composition may have a glass transition temperature (Tg) of less than 0° C. after curing (real curing). When the glass transition temperature range is satisfied, brittle characteristics can be secured in a relatively short time even at a low temperature where the battery module or the battery pack can be used, thereby ensuring impact resistance and vibration resistance characteristics. On the other hand, if the above range is not satisfied, the tacky property of the cured product may be excessively high or the thermal stability may be lowered. In one example, the lower limit of the glass transition temperature of the urethane-based composition after curing may be about −70° C. or higher, −60° C. or higher, −50° C. or higher, −40° C. or higher, or about −30° C. or higher, and the upper limit may be about −5° C. or lower, −10° C. or lower, −15° C. or lower, or about −20° C. or lower. The glass transition temperature can be measured after curing a polyol resin and an isocyanate component (without any filler).

Furthermore, in the present application, an additive may be used in order to secure the use of the resin composition and the function required according to the use thereof. For example, the resin composition may comprise a predetermined filler in consideration of thermal conductivity, insulating property, heat resistance (TGA analysis), and the like of the resin layer. The form or method in which the filler is contained in the resin composition is not particularly limited. For example, the filler may be used to form a urethane-based composition in a state that it is contained in the main composition part and/or the curing agent composition part in advance. Alternatively, in the process of mixing the main composition part and the curing agent composition part, the separately prepared filler may also be used by a method that it is mixed together.

In one example, the filler included in the composition may be at least a thermally conductive filler. In the present application, the term thermally conductive filler may mean a material having a thermal conductivity of about 1 W/mK or more, about 5 W/mK or more, about 10 W/mK or more, or about 15 W/mK or more. Specifically, the thermal conductivity of the thermally conductive filler may be about 400 W/mK or less, about 350 W/mK or less, or about 300 W/mK or less. The kind of the usable thermally conductive filler is not particularly limited, but it may be a ceramic filler when insulating property and the like are considered together. For example, ceramic particles such as alumina, AlN (aluminum nitride), BN (boron nitride), silicon nitride, SiC or BeO may be used. The shape or ratio of the filler is not particularly limited, which may be suitably adjusted in consideration of the viscosity of the urethane-based composition, the possibility of settling in the cured resin layer of the composition, the desired heat resistance or thermal conductivity, an insulating property, a filling effect or dispersibility, and the like. Generally, the larger the size of the filler, the higher the viscosity of the composition comprising the same and the higher the possibility that the filler precipitates in the resin layer. Furthermore, the smaller the size, the thermal resistance tends to be increased. Therefore, the filler having an appropriate type and size may be selected in consideration of the above points, and two or more fillers may also be used, if necessary. Considering the filling amount, it is advantageous to use a spherical filler, but considering network formation or conductivity, a filler in a form such as needle-like morphology or flattened morphology may also be used. The thermal conductivity of the filler can be measured according to known methods, wherein the thermal conductivity of the filler can be measured by a method of melting the filler and then making a specimen.

In one example, the composition may comprise a thermally conductive filler having an average particle diameter in a range of 0.001 μm to 80 μm. In another example, the average particle diameter of the filler may be 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, about 70 μm or less, about 65 μm or less, about 60 μm or less, about 55 μm or less, about 50 μm or less, about 45 μm or less, about 40 μm or less, about 35 μm or less, about 30 μm or less, about 25 μm or less, about 20 μm or less, about 15 μm or less, about 10 μm or less, or about 5 μm or less. The average particle diameter can be measured using a PSA (particle size analysis) apparatus. In one example, when ranking from 1 to 100 for particles by size, the average particle diameter may mean D (50), which is the particle size of the 50th order.

In order to obtain excellent heat dissipation performance, it can be considered that a high content of the thermally conductive filler is used. For example, the filler may be used in an amount of about 50 to 2,000 parts by weight, relative to 100 parts by weight of the total resin components, that is, the sum of the ester-based polyol resin and polyisocyanate contents. In another example, the filler content may be used in excess of the total resin component. Specifically, the filler may be used in an amount of about 100 parts by weight or more, about 150 parts by weight or more, about 200 parts by weight or more, about 250 parts by weight or more, about 300 parts by weight or more, about 350 parts by weight or more, about 400 parts by weight or more, about 500 parts by weight or more, about 550 parts by weight or more, about 600 parts by weight or more, or about 650 parts by weight or more, relative to 100 parts by weight of the sum of the ester-based polyol resin and polyisocyanate contents. In one example, when the filler is used in the above range, it may be distributed in the same amount in the main composition part and the curing agent composition part.

As described above, when the thermally conductive filler is used in a high content, the viscosity of the main composition part or the curing agent composition part, containing the filler, or the composition comprising them may increase. As described above, when the viscosity of the resin composition is too high, the injection processability is poor, whereby the physical properties required for the resin layer may not be sufficiently realized throughout the resin layer. In view of this point, it is preferable to use a low-viscosity component which may be liquid or have sufficient flow as the resin component.

In one example, each of the ester-based polyol resin and polyisocyanate components may have a viscosity of 10,000 cP or less. Specifically, the resin component may have a viscosity of 8,000 cP or less, 6,000 cP or less, 4,000 cP or less, 2,000 cP or less or 1,000 CP or less. Preferably, the upper limit of the viscosity may be 900 cP or less, 800 cP or less, 700 cP or less, 600 cP or less, 500 cP or less, or 400 cP or less. Although not particularly limited, the lower limit of viscosity of each resin component may be 50 cP or more, or 100 cP or more. If the viscosity is too low, the processability may be good, but as the molecular weight of the raw material is low, the possibility of volatilization may increase, and heat resistance/cold resistance, flame retardance and adhesive force may be deteriorated, where such disadvantages can be prevented by satisfying the lower limit range. The viscosity of the resin can be measured at room temperature, for example, using a Brookfield LV type viscometer.

In addition to the above, various kinds of fillers can be used. For example, the use of a carbon (-based) filler such as graphite may be considered in order to secure insulation properties of the cured resin layer of the resin composition. Alternatively, a filler such as, for example, fumed silica, clay or calcium carbonate can be used. The form or content ratio of the filler is not particularly limited, which may be selected in consideration of the viscosity of the resin composition, the possibility of settling in the resin layer, the thixotropy, the insulating property, the filling effect or the dispersibility.

The composition may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force.

The thixotropic agent controls the viscosity of the resin composition depending on the shear force, whereby the process of manufacturing the battery module can be effectively performed. As the usable thixotropic agent, fumed silica and the like can be exemplified.

The diluent or dispersant is usually used for lowering the viscosity of the resin composition, and any of various kinds known in the art can be used without limitation as long as it can exhibit the above action.

The surface treatment agent is for surface treatment of the filler introduced into the resin layer, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

In addition, the resin composition may further comprise a flame retardant or a flame retardant auxiliary agent. In this case, a known flame retardant may be used without any particular limitation, and for example, a flame retardant in the form of a solid phase or a liquid flame retardant may be applied. The flame retardant includes, for example, organic flame retardants such as melamine cyanurate and inorganic flame retardants such as magnesium hydroxide. When the amount of the filler filled in the resin layer is large, a liquid type flame retardant material (TEP, triethyl phosphate, or TCPP, tris(1,3-chloro-2-propyl)phosphate, etc.) may also be used. In addition, a silane coupling agent capable of acting as a flame retardant synergist may also be added.

The composition may comprise the above-described constitutions, and may be a solvent type composition, a water-based composition or a solventless type composition, but considering the convenience of the manufacturing process, which is described below, the solventless type may be suitable.

The composition of the present application may have physical properties suitable for the use as described below after curing. Among physical properties mentioned in this specification, when the measured temperature influences the physical properties, the physical properties may be physical properties measured at room temperature, unless otherwise specified. Furthermore, the expression "after curing" in connection with physical properties can be used in the same meaning as the above-described real curing.

In one example, the resin composition may have predetermined adhesive force ($S_1$) at room temperature after curing. Specifically, the resin layer may have adhesive force of about 150 gf/10 mm or more, 200 gf/10 mm or more, 250 gf/10 mm or more, 300 gf/10 mm or more, 350 gf/10 mm or more, or 400 gf/10 mm or more. When the adhesive force satisfies the above range, appropriate impact resistance and vibration resistance can be ensured. The upper limit of the resin layer adhesive force is not particularly limited, which may be about 1,000 gf/10 mm or less, 900 gf/10 mm or less, 800 gf/10 mm or less, 700 gf/10 mm or less, 600 gf/10 mm or less, or 500 gf/10 mm or less or so. When the adhesive force is too high, there is a risk that the pouch portion to which the cured composition is attached will tear. Specifically, in the case where a shock occurs in which the shape of the battery module is deformed due to an accident while driving the vehicle, when the battery cell is attached too strongly through the cured resin layer, dangerous materials inside the battery can be exposed or explode, while the pouch is torn. The adhesive force can be measured with respect to the aluminum pouch. For example, after the aluminum pouch used for manufacturing a battery cell is cut to a width of about 10 mm, a resin composition is loaded on a glass plate, and the cut aluminum pouch is loaded thereon so that the resin composition is in contact with the PET (poly(ethylene terephthalate)) side of the pouch and then the resin composition is cured under the conditions of 25° C. and 50% RH for 24 hours, the adhesive force can be measured, while the aluminum pouch is peeled off at a peeling angle of 180° and a peeling speed of 300 mm/min with a tensile tester (texture analyzer).

In another example, the adhesive force of the resin composition after curing can be maintained at a considerable level even under high-temperature/high-humidity. Specifically, in the present application, the % ratio [($S_2/S_1$)×100] of the adhesive force ($S_2$) measured by the same method after a high-temperature/high-humidity acceleration test performed under predetermined conditions relative to the adhesive force ($S_1$) measured at room temperature may be 70% or more, or 80% or more. In one example, the high-temperature/high-humidity acceleration test can be measured after storing the same specimen as the specimen used for measuring the room temperature adhesive force for 10 days under conditions of a temperature of 40 to 100° C. and humidity of 75% RH or more. When the adhesive force and the relationship are satisfied, excellent adhesion durability can be maintained even if the use environment of the battery module changes.

In one example, the resin composition can have excellent heat resistance after curing. In this regard, the composition of the present application may have a 5% weight loss temperature of 120° C. or higher at the time of a thermogravimetric analysis (TGA) measured for the cured product of only the resin components in a state of comprising no filler. In addition, the composition of the present application may have an 800° C. balance of 70 wt % or more at the time of a thermogravimetric analysis (TGA) measured for the cured product of the resin composition in a state of comprising the filler. In another example, the 800° C. balance may be about 75 wt % or more, about 80 wt % or more, about 85 wt % or more, or about 90 wt % or more. In another example, the 800° C. balance may be about 99 wt % or less. At this time, the thermogravimetric analysis (TGA) can be measured within a range of 25 to 800° C. at a temperature raising rate of 20° C./minute under a nitrogen ($N_2$) atmosphere of 60 cm$^3$/minute. The heat resistance characteristics related to the thermogravimetric analysis (TGA) can be secured by controlling the kind of the resin and/or the filler or the content thereof.

In another example of the present application, the present application relates to a battery module. The module comprises a module case and a battery cell. The battery cell may be housed in the module case. One or more battery cells may be present in the module case, and a plurality of battery cells may be housed in the module case. The number of battery cells housed in the module case is adjusted depending on applications and the like, which is not particularly limited. The battery cells housed in the module case may be electrically connected to each other.

The module case may comprise at least sidewalls and a bottom plate which form an internal space in which the battery cell can be housed. Also, the module case may further comprise a top plate for sealing the internal space. The sidewalls, the bottom plate, and the top plate are integrally formed with each other, or the sidewalls, the bottom plate, and/or the top plate as separated from each other are assembled, so that the module case can be formed. The shape and size of such a module case are not particularly limited and may be appropriately selected depending on applications, or the type and number of the battery cell housed in the internal space, and the like.

Here, since there are at least two plates constituting the module case, the term top plate and bottom plate are terms having relative concepts used to distinguish them. That is, it does not mean that in the actual use state, the top plate necessarily exists at the upper portion and the bottom plate necessarily exists at the lower portion.

FIG. 2 is a view showing an exemplary module case (10), which is an example of a box-shaped case (10) comprising one bottom plate (10a) and four sidewalls (10b). The module case (10) may further comprise a top plate (10c) sealing the internal space.

FIG. 3 is a schematic view of the module case (10) of FIG. 2, as observed from above, in which the battery cells (20) are housed.

A hole may be formed in the bottom plate, the sidewalls, and/or the top plate of the module case. When a resin layer is formed by an injection process, the hole may be an injection hole used for injecting a material for forming the resin layer, that is, the resin composition, as described below. The shape, number and position of the hole can be adjusted in consideration of the injection efficiency of the material for forming the resin layer. In one example, the hole may be formed at least on the bottom plate and/or the top plate.

In one example, the hole may be formed at about ¼ to ¾ point or about ⅜ to ⅞ point, or approximately the middle, of the total length of the sidewalls, the bottom plate, or the top plate. By injecting the resin composition through the injection hole formed at this point, the resin layer can be injected so as to have a wide contact area. As shown in FIG. 4, the ¼, ¾, ⅜ or ⅞ point is, for example, a ratio of the distance (A) to the hole forming position relative to the total length (L) measured based on any one end face (E) of the bottom plate or the like. The end (E) at which the length (L) and the distance (A) are formed may be any end (E) as long as the length (L) and the distance (A) are measured from the same end (E). In FIG. 4, the injection hole (50a) is in a form of being located at the approximately middle part of the bottom plate (10a).

The size and shape of the injection hole are not particularly limited, and can be adjusted in consideration of the injection efficiency of a resin layer material to be described below. For example, the hole may have a circular shape, an elliptical shape, a polygonal shape such as triangle or square, or an amorphous shape. The number and spacing of the injection hole are not particularly limited and can be adjusted so that the resin layer can have a wide contact area with the bottom plate or the like, as described above.

An observation hole (for example, 50b in FIG. 4) may be formed at the end of the top plate and the bottom plate, and the like where the injection hole is formed. For example, when the material of the resin layer is injected through the injection hole, such an observation hole may be formed for observing whether the injected material is injected well to the end of the sidewalls, the bottom plate, or the top plate. The position, shape, size, and number of the observation hole are not particularly limited as long as they are formed so that it can be confirmed whether the injected material is properly injected.

The module case may be a thermally conductive case. The term thermally conductive case means a case in which the thermal conductivity of the entire case is 10 W/mk or more, or at least a portion having the thermal conductivity as above is included. For example, at least one of the sidewalls, the bottom plate and the top plate as described above may have the thermal conductivity described above. In another example, at least one of the sidewalls, the bottom plate, and the top plate may comprise a portion having the thermal conductivity. For example, as described below, the battery module of the present application may comprise a first filler-containing cured resin layer in contact with the top plate and the battery cell, and a second filler-containing cured resin layer in contact with the bottom plate and the battery cell, where at least the second filler-containing cured resin layer may be a thermally conductive resin layer, whereby it can be said that at least the bottom plate may have thermal conductivity or may comprise a thermally conductive portion.

Here, the thermal conductivity of the thermally conductive top plate, bottom plate, sidewall or the thermally conductive portion may be 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or about 195 W/mk or more. The higher the value of the thermal conductivity is, the more advantageous it is from the viewpoint of the heat dissipation property of the module, and the like, and the upper limit is not particularly limited. In one example, the thermal conductivity may be about 1,000 W/mk or less, 900 W/mk or less, 800 W/mk or less, 700 W/mk or less, 600 W/mk or less, 500 W/mk or less, 400 W/mk or less, 300 W/mk or less, or 250 W/mk or less, but is not limited thereto. The kind of materials exhibiting the thermal conductivity as above is not particularly limited, and for example, includes metal materials such as aluminum, gold, pure silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least one portion having the aforementioned thermal conductivity.

In the module case, the portion having a thermal conductivity in the above range may be a portion in contact with the resin layer and/or the insulating layer as described below. In addition, the portion having the thermal conductivity may be a portion in contact with a cooling medium such as cooling water. When it has such a structure, heat generated from the battery cell can be effectively discharged to the outside.

Also, the type of the battery cell housed in the module case is not particularly limited, and a variety of known battery cells may be applied. In one example, the battery cell may be a pouch type. Referring to FIG. 5, the pouch type battery cell (100) may typically comprise an electrode assembly, an electrolyte, and a pouch exterior material.

FIG. 5 is an exploded perspective view schematically showing the configuration of an exemplary pouch type cell, and FIG. 6 is a combined perspective view of the configuration of FIG. 5.

The electrode assembly (110) included in the pouch type cell (100) may be in a form in which at least one positive plate and at least one negative plate are disposed with each separator interposed therebetween. The electrode assembly (110) may be a wound type in which one positive plate and one negative plate are wound together with the separator, or a stacked type in which a plurality of positive plates and a plurality of negative plates are laminated alternately with each separator interposed therebetween.

The pouch exterior material (120) may be configured in a form equipped with, for example, an outer insulating layer, a metal layer, and an inner adhesive layer. Such an exterior material (120) protects inner elements such as the electrode assembly (110) and the electrolyte, to complement the electrochemical properties by the electrode assembly (110) and the electrolyte, and to consider heat dissipation or the like. Such a metal thin film may be interposed between insulating layers formed of an insulating material in order to ensure electrical insulation with elements such as the electrode assembly (110) and the electrolyte, or other elements outside the battery (100). In addition, the pouch may further comprise, for example, a polymer resin layer (base material) such as PET.

In one example, the exterior material (120) may comprise an upper pouch (121) and a lower pouch (122), where in at least one of the upper pouch (121) and the lower pouch (122), a concave internal space (I) can be formed. The electrode assembly (110) can be housed in the internal space (I) of this pouch. A sealing portion (S) is provided on each outer peripheral surface of the upper pouch (121) and the lower pouch (122) and these sealing portions (S) are bonded to each other so that the internal space accommodating the electrode assembly (110) can be sealed.

Each electrode plate of the electrode assembly (110) is provided with an electrode tab, and one or more electrode tabs may be connected to an electrode lead. The electrode lead may be interposed between the sealing portions (S) of the upper pouch (121) and the lower pouch (122) and exposed to the outside of the exterior material (120) to function as an electrode terminal of the secondary battery (100).

The shape of the pouch type cell as described above is only one example, and the battery cell applied in the present application is not limited to the above-described kind. In the present application, various shapes of known pouch type cells or other types of cells can be all applied as battery cells.

The battery module of the present application may further comprise a resin layer. Specifically, the battery module of the present application may comprise a cured resin layer in which the filler-containing composition is cured. The cured resin layer may be formed from the urethane-based composition as described above.

The battery module may comprise, as the resin layer, a first filler-containing cured resin layer in contact with the top plate and the battery cell, and a second filler-containing cured resin layer in contact with the bottom plate and the battery cell. One or more of the first and second filler-containing cured resin layers may comprise a cured product of the urethane-based composition as described above, thereby having the predetermined adhesive force, cold resistance, heat resistance, and insulation as described above. In addition, the first and second filler-containing cured resin layers may have the following characteristics.

In one example, the resin layer may be a thermally conductive resin layer. In this case, the thermal conductivity of the thermally conductive resin layer may be about 1.5 W/mK or more, about 2 W/mK or more, 2.5 W/mK or more, 3 W/mK or more, 3.5 W/mK or more, or 4 W/mK or more. The thermal conductivity may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the resin layer is a thermally conductive resin layer as above, the bottom plate, the top plate and/or the sidewall, and the like to which the resin layer is attached may be a portion having the above-described thermal conductivity of 10 W/mK or more. At this time, the module case portion representing the thermal conductivity may be a part in contact with a cooling medium, for example, cooling water or the like. The thermal conductivity of the resin layer is measured using known hot disk equipment, which is, for example, a value measured according to ASTM D5470 standard or ISO 22007-2 standard. The thermal conductivity of such a resin layer may be secured, for example, by appropriately adjusting the filler contained in the resin layer and the content thereof, as described above.

In one example, in the battery module, the resin layer or the battery module, to which the resin layer is applied, may have a thermal resistance of 5 K/W or less, 4.5 K/W or less, 4 K/W or less, 3.5 K/W or less, 3 K/W or less, or about 2.8 K/W. When the resin layer or the battery module, to which the resin layer is applied, is adjusted in order to exhibit the thermal resistance in the above range, excellent cooling efficiency or heat dissipation efficiency can be secured. The measurement of the thermal resistance can be performed by attaching a temperature sensor according to the cell position on the module while driving the battery module and calculating it based on the temperature measured from the sensor. The method of measuring the thermal resistance is not particularly limited, and for example, the thermal resistance can be measured according to ASTM D5470 standard or ISO 22007-2 standard.

In one example, the resin layer may be a resin layer formed to maintain durability even in a predetermined thermal shock test. The thermal shock test may be performed in a manner known in the art. For example, when one cycle is composed of holding the battery module at a low temperature of −40° C. for 30 minutes, and then again holding it for 30 minutes after increasing the temperature to 80° C., it may be a resin layer that cannot be peeled off or cracked from the module case or the battery cell of the battery module after the thermal shock test that the cycle is repeated 100 times. For example, when the battery module is applied to a product, such as an automobile, requiring a long guarantee period (for example, about 15 years or more in the case of the automobile), performance may be required in the same level as above for ensuring durability.

In one example, the resin layer may be a flame retardant resin layer. In the present application, the term flame retardant resin layer may mean a resin layer showing a V-0 rating in UL 94 V Test (vertical burning test). This can secure stability against fires and other accidents that may occur in the battery module.

In one example, the resin layer may have a specific gravity of 5 or less. In another example, the specific gravity may be 4.5 or less, 4 or less, 3.5 or less, or 3 or less. The resin layer showing the specific gravity in this range is advantageous for manufacturing a lightweight battery module. The lower the value of the specific gravity is, the more advantageous the lightening of the module is, and thus the lower limit is not particularly limited. For example, the specific gravity can be about 1.5 or more, or 2 or more. The components added to the resin layer can be adjusted so that the resin layer exhibits the specific gravity in the above range. For example, when the fillers are added, a method of applying fillers capable of securing a desired thermal conductivity even at a low specific gravity, if possible, that is, fillers having a low specific gravity or surface-treated fillers, and the like may be used.

In one example, it is preferable that the resin layer does not contain volatile substances, if possible. For example, the resin layer may have a ratio of non-volatile components of 90 wt % or more, 95 wt % or more, or 98 wt % or more. Here, the non-volatile components and the ratio thereof can be specified in the following manner. That is, the non-volatile component can be defined as the remaining portion after the resin layer is maintained at 100° C. for about 1 hour. Thus, the ratio of the non-volatile component can be measured based on the initial weight of the resin layer and the ratio after the resin layer is maintained at 100° C. for about 1 hour.

In one example, it may be advantageous that the resin layer has a low shrinkage ratio during the process of curing or after curing. This can prevent the occurrence of peeling or voids that may occur during the manufacture or use process of the module. The shrinkage ratio can be appropriately adjusted within a range capable of exhibiting the above-mentioned effect, and can be, for example, less than 5%, less than 3% or less than about 1%. The lower the value of the shrinkage ratio is, the more advantageous the shrinkage ratio is, and thus the lower limit is not particularly limited.

In one example, the resin layer may have a low coefficient of thermal expansion (CTE) to prevent the occurrence of peeling or voids, and the like that may occur during the manufacture or use process of the module. The coefficient of thermal expansion can be, for example, less than 300 ppm/K, less than 250 ppm/K, less than 200 ppm/K, less than 150 ppm/K or less than about 100 ppm/K. The lower the value of the coefficient of thermal expansion is, the more advantageous the coefficient is, and thus the lower limit is not particularly limited. The method of measuring the coefficient of thermal expansion is not particularly limited. For example, it is measured using a TMA (thermo mechanical analyzer) under conditions of an expansion mode, a 0.05N load and −40 to 125 degrees at 5° C./min, where the coefficient of thermal expansion can be measured in a manner that confirms the length change rate within the designated temperature section based on the modified length.

In one example, in order to impart good durability or impact resistance to the battery module, the resin layer may have an appropriate level of tensile strength. For example, the resin layer may be configured to have a Young's modulus of about 1.0 MPa or more. The Young's modulus may be, for example, a slope value when is measured in the tensile mode at a low temperature (about −40° C.), room temperature (about 25° C.) and a high temperature (about 80° C.) for each point within the range of −40 to 80° C. The higher the temperature, the lower the Young's modulus is measured. For example, the resin layer of the present application may have a Young's modulus of 1.0 Mpa or more, more specifically, in the range of 10 to 500 Mpa. When the Young's modulus is less than the above range, the function of fixing a large weight cell is not good, and when it is too large, brittle characteristics are strong, so that cracks may occur in an impact situation such as a vehicle collision.

In one example, it may be advantageous that the resin layer exhibits an appropriate hardness. For example, if the hardness of the resin layer is too high, the reliability may be adversely affected because the resin layer has a brittle characteristic. When this point is considered, by controlling the hardness of the resin layer, the impact resistance and the vibration resistance can be secured, and the durability of the product can be ensured. The resin layer may have, for example, a hardness in Shore A type of less than 100, 99 or less, 98 or less, 95 or less, or 93 or less, or a hardness in Shore D type of less than about 80, about 70 or less, about 65 or less, or about 60 or less. The lower limit of the hardness is not particularly limited. For example, the hardness in Shore A type may be 60 or more, or the hardness in Shore 00 type may be 5 or more, or about 10 or more or so. The hardness in the above range can be ensured by controlling the content of the filler and the like. The Shore hardness can be measured according to a known method using a hardness meter for each type, such as, for example, a shore A hardness meter. A known method is ASTM D2240 or the like.

By forming the cured resin layer satisfying the characteristics in the battery module as described above, a battery module having excellent durability against external impact or vibration can be provided.

In the battery module of the present application, at least one of the sidewall, the bottom plate and the top plate in contact with the resin layer may be the above-described thermally conductive sidewall, bottom plate or top plate. On the other hand, in this specification, the term contact may also mean a case where, for example, the top plate, the bottom plate and/or the sidewall or the battery cell is in direct contact with the resin layer, or another element, for example, an insulating layer or the like exists therebetween. In addition, the resin layer in contact with the thermally conductive sidewall, bottom plate or top plate may be in thermal contact with the target. At this time, the thermal contact may mean a state that the resin layer is in direct contact with the bottom plate or the like, or other elements, for example, an insulating layer or the like as described below, between the resin layer and the bottom plate or the like are present, but the other element does not interfere with heat transfer from the battery cell to the resin layer, and from the resin layer to the bottom plate or the like. Here, the phrase "does not interfere with heat transfer" means the case that even when other elements (e.g., an insulating layer or a guiding portion as described below) exists between the resin layer and the bottom plate or the like, the total thermal conductivity of the other elements and the resin layer is about 1.5 W/mK or more, about 2 W/mK or more, 2.5 W/mK or more, 3 W/mK or more, 3.5 W/mK or more, or 4 W/mK or more, or the total thermal conductivity of the resin layer and the bottom plate or the like in contact therewith is included in the range even when the other elements are present. The thermal conductivity of the thermal contact may be 50 W/mk or less, 45 W/mk or less, 40 W/mk or less, 35 W/mk or less, 30 W/mk or less, 25 W/mk or less, 20 W/mk or less, 15 W/mk or less, 10 W/mk or less, 5 W/mk or less, 4.5 W/mk or less, or about 4.0 W/mk or less. This thermal contact can be achieved by controlling the thermal conductivity and/or the thickness of the other element when the other element is present.

The thermally conductive resin layer may be in thermal contact with the bottom plate or the like and may also be in thermal contact with the battery cell. By adopting such a structure, various fastening parts or cooling equipment of the module, and the like, which was previously required in the construction of a general battery module or a battery pack as an assembly of such modules, is greatly reduced, and simultaneously it is possible to implement a module in which heat dissipation characteristics are ensured and more battery cells are housed per unit volume. Accordingly, the present application can provide a battery module having high power while being more compact and lighter.

FIG. 7 is an exemplary cross-sectional diagram of the battery module. In FIG. 7, the module may be in a form which comprises a case (10) including sidewalls (10b) and a bottom plate (10a); a plurality of battery cells (20) housed inside the case and a resin layer (30) in contact with both the battery cell (20) and the case (10). FIG. 7 is a diagram of the resin layer (30) existing on the side of the bottom plate (10a), but the battery module of the present application may also comprise a resin layer located on the side of the top plate in the same form as FIG. 7.

In the above structure, the bottom plate or the like in contact with the resin layer (30) may be the thermally conductive bottom plate or the like as described above.

The contact area between the resin layer and the bottom plate or the like may be about 70% or more, about 75% or more, about 80% or more, about 85% or more, about 90% or more, or about 95% or more, relative to the total area of the bottom plate or the like. The upper limit of the contact area is not particularly limited, and may be, for example, 100% or less, or less than about 100%.

When the top plate or the bottom plate is thermally conductive and the cured resin layer in contact therewith is also thermally conductive, the thermally conductive portion or the thermally conductive bottom plate or the like may be a portion in contact with a cooling medium such as cooling water. That is, as schematically shown in FIG. 7, the heat (H) can be easily discharged to the bottom plate or the like by the above structure, and heat release can be easily performed even in more simplified structures by contacting this bottom plate or the like with the cooling medium (CW).

The first and second cured resin layers may each have a thickness in a range of, for example, about 100 μm to 5 mm or in a range of about 200 μm to 5 mm. In the structure of the present application, the thickness of the resin layer may be set to an appropriate thickness in consideration of the desired heat dissipation characteristics or durability. The thickness may be the thickness of the thinnest portion of the resin layer, the thickness of the thickest portion, or the average thickness.

As shown in FIG. 7, a guiding portion (10d) which can guide the housed battery cell (20) may also be present on at least one surface of the inside of the module case (10), for example, a surface (10a) in contact with the resin layer (30). At this time, the shape of the guiding portion (10d) is not particularly limited, and an appropriate shape can be employed in consideration of the shape of the battery cell to be applied. The guiding portion (10*d*) may be integrally formed with the bottom plate or the like, or may be attached separately thereto. The guiding portion (10*d*) may be formed using a thermally conductive material, for example, a metallic material such as aluminum, gold, pure silver, tungsten, copper, nickel, or platinum in consideration of the above-described thermal contact. In addition, although not shown in the drawings, an interleaf or an adhesive layer may also be present between the housed battery cells (20). Here, the interleaf can act as a buffer upon charging and discharging the battery cell.

In one example, the battery module may further comprise an insulating layer between the module case and the battery cell or between the resin layer and the module case. FIG. 8 illustratively shows a case where the insulating layer (40) is formed between the guiding portion (10*d*) formed on the bottom plate (10*a*) of the case and the resin layer (30). By adding an insulating layer, it is possible to prevent problems such as an electrical short phenomenon or a fire due to a contact between the cell and the case by an impact that may occur during use. The insulating layer may be formed using an insulating sheet having high insulation and thermal conductivity, or may be formed by applying or injecting a material exhibiting insulating properties. For example, in a method for manufacturing a battery module as described below, a process of forming an insulating layer may be performed before the injection of the resin composition. A so-called TIM (thermal interface material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, about 10 kV/mm or more, about 15 kV/mm or more, 20 kV/mm or more, 25 kV/mm or more, or 30 kV/mm or more. The higher the value of the dielectric breakdown voltage is, the better the insulation shows, and thus it is not particularly limited. For example, the dielectric breakdown voltage of the insulating layer may be about 100 kV/mm or less, 90 kV/mm or less, 80 kV/mm or less, 70 kV/mm or less, or 60 kV/mm or less. The thickness of the insulating layer can be set to an appropriate range in consideration of the insulating property and the thermal conductivity of the insulating layer, and the like, and for example, may be about 5 μm or more, 10 μm or more, 20 μm or more, 30 μm or more, 40 μm or more, 50 μm or more, 60 μm or more, 70 μm or more, 80 μm or more, or 90 μm or more or so. In addition, the upper limit of the thickness is not particularly limited and may be, for example, about 1 mm or less, about 200 μm or less, 190 μm or less, 180 μm or less, 170 μm or less, 160 μm or less, or 150 μm or less.

In another example of the present application, the present application relates to a method for manufacturing a battery module, for example, the above-mentioned battery module.

The manufacturing method of the present application may comprise steps of injecting a resin composition into the above-described module case; housing a battery cell in the module case, and curing the resin composition to form the resin layer.

The order of the step of injecting the resin composition into the module case and the step of housing the battery cell in the module case is not particularly limited. For example, the resin composition may be first injected into the module case, followed by housing the battery cell in that state, or the battery cell may be first housed inside the module case, followed by injecting the resin composition therein.

As the resin composition, the above-mentioned resin composition can be used.

The method of injecting the resin composition into the module case is not particularly limited, and a known method can be applied. For example, a resin composition may be injected by pouring the resin composition into an opening of a module case, or a method of injecting a resin composition by the above-described injection hole formed on a module case, a method of applying a resin composition to both a battery cell and a battery module, and the like may be applied. For proper fixing, the injection process may also be performed while constantly vibrating the battery module or the battery cell.

The manner, in which the battery cell is housed in the module case into which the resin composition is injected or in the module case before the composition is injected, is not particularly limited.

The housing of the battery cells can be performed by arranging the battery cells at suitable positions in the module case in consideration of the desired arrangement and the like. In addition, when the cartridge structure is present, the step can be performed by placing the battery cells at proper positions of the cartridge structure, or inserting the cartridge structure, in which the battery cells are located, into the module case.

After the battery cells are housed therein, adhesion between the battery cells or adhesion between the battery cells and the module case can be achieved by curing the injected resin composition. The manner of curing the resin composition is not particularly limited. In one example, when the composition is used, the resin composition can be cured by a method of holding the resin composition at room temperature for a predetermined time (24 hours). The curing may also be accelerated by applying heat for a certain period of time at such a level as not to impair the thermal stability of the cell. For example, by applying heat at a temperature of less than 60° C., more specifically, in a range of about 30° C. to 50° C., before curing or during the curing process, or before housing the battery cell or during the housing process, the take time can be reduced and the processability can be improved. The cured product capable of achieving adhesion between battery cells or achieving adhesion between the battery cell and the module case may have a conversion rate of at least 80% or more, as described above.

In another example of the present application, the present application relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of such a device may include, but is not limited to, automobiles such as electric vehicles, and may be devices for all applications requiring secondary batteries as power. In addition, a method of constructing the automobile using the battery module or the battery pack is not particularly limited, and a general method known in the related art can be applied.

Advantageous Effects

According to one example of the present application, there is provided a resin composition which has excellent injection processability into a battery module and is capable of preventing contamination of other components in the battery module after injection. In addition, the composition has excellent insulation property, heat dissipation property, and adhesiveness, and the like after curing.

BRIEF DESCRIPTION OF DRAWINGS

FIG. 1 shows an example of determining an amorphous characteristic or a sufficiently low crystallizability of an ester-based polyol according to one example of the present application.

FIG. 2 shows an exemplary module case, which can be applied in the present application.

FIG. 3 schematically shows a form in which battery cells are housed in a module case.

FIG. 4 schematically shows an exemplary bottom plate where injection holes and observation holes are formed.

FIGS. 5 and 6 schematically show an exemplary battery pouch which can be used as a battery cell.

FIGS. 7 and 8 schematically show the structure of an exemplary battery module.

The reference numerals and symbols related to the drawings are as follows.

10: module case
10a: bottom plate
10b: sidewall
10c: top plate
10d: guiding portion
20: battery cell
30: resin layer
50a: injection hole
50b: observation hole
40: insulating layer
100: pouch type cell
110: electrode assembly
120: exterior material
121: upper pouch
122: lower pouch
S: sealing portion

BEST MODE

Hereinafter, the battery module of the present application will be described with reference to examples and comparative examples, but the scope of the present application is not limited by the following range.

Evaluation Methods

1. Viscosity

A viscosity of a resin composition was measured at room temperature and a shear rate condition of from 0.01/s to 10.0/s using a rheological property measuring machine (ARES). The viscosity mentioned in the examples is a viscosity at a point of a shear rate of 2.5/s, where a TI (thixotropic index) can be determined through a ratio of a viscosity at a point of a shear rate of 0.25/s to a viscosity at a point of a shear rate of 2.5/s.

2. Insulation Performance

When both the withstand voltage and the breakdown voltage described below satisfy a predetermined value, they are denoted by 0, and when they are not denoted by X, (1) Withstanding Voltage It was measured according to ISO 6469-3. Specifically, the composition was injected in a module state, and 2 kV was applied for 1 second after 1 hour, where in the case of the leakage current of less than 1 mA, it was indicated by O and in the case of the leakage current of 1 mA or more, it was indicated by X.

(2) Dielectric Breakdown Voltage

A cured product (really cured) having a thickness of 2 mm was prepared on the basis of ASTM D149, and when the dielectric breakdown voltage was measured, in the case of the value of 10 kV/mm or more, it was indicated by O and in the case of less than 10 kV/mm, it was indicated by X.

3. Processability

As a module case having the same shape as FIG. 1, a module case having a bottom plate, sidewalls, and a top plate, made of aluminum, was used. The case was used, in which guiding portions for guiding installation of battery cells were formed on the internal surface of the bottom plate in the module case, injection holes for injecting the resin composition were formed at regular intervals in the central part of the top plate and the bottom plate in the module case, and observation holes were formed at the end of the top plate and the bottom plate. A bundle of pouches laminating a plurality of battery pouches was housed in the module case. Subsequently, the top plate was covered on the upper surface of the module case.

(1) The resin composition was injected into the injection holes of each of the top plate and the bottom plate, and it was confirmed that the composition reached the observation hole. When the time taken to reach the observation hole was within 5 minutes, it was indicated by O, and when the time exceeded 5 minutes or the composition did not have enough flowability to reach the observation hole, or when the composition was not evenly filled in the upper part and the lower part in the gravity direction, respectively, in the module due to too high flowability after the injection, it was indicated by X.

(2) After 1 hour from the composition injection (filling), it was observed whether the composition flowed out from the module while moving and vibrating the module. When there was no external contamination due to the flowing composition, it was indicated by O, and when there was contamination, it was indicated by X.

Examples and Comparative Examples

Example 1

Polyol: A resin (having a viscosity of about 280 cP as measured with a Brookfield LV type viscometer) comprising, as the caprolactone-based polyol represented by Formula 2 above, a polyol having a number of repeating units (m in Formula 2) of about 1 to 3 or so and containing 1,4-butanediol as the polyol-derived unit (Y in Formula 2) was used in a predetermined amount in the main composition.

Isocyanate: A mixture (having a viscosity of 170 cP as measured with a Brookfield LV type viscometer) of HDI (hexamethylene diisocyanate) and a HDI trimer was used in the curing agent composition. At this time, the used amount of the isocyanate compound was adjusted so that the NCO index was about 100.

Filler: Alumina was used. The content thereof was adjusted in a ratio of 1,000 parts by weight relative to 100 parts by weight of the sum of the polyol and isocyanate contents, and the alumina was divided and formulated in the same amount into the main composition part and the curing agent composition part.

Dispersant: An anionic dispersant was introduced in a predetermined content.

Catalyst: Dibutyltin dilaurate (DBTDL) was used in the same contents as in Table 1.

The components were mixed to prepare a two-component urethane-based composition.

Example 2

A composition was prepared in the same manner as in Example 1, except that the dispersant content was added at 70% of the dispersant content used in Example 1.

Example 3

The main composition part was constituted to comprise a polydimethylsiloxane (PDMS) having a vinyl group, and the curing agent composition part was constituted to comprise a polydimethylsiloxane having a vinyl group and a polydimethylsiloxane having a hydride group, where each was formulated with a filler so as to have a viscosity of 200,000 to 300,000 or so. The used amount of platinum catalyst was appropriately controlled during the mixing process.

Comparative Example 1

A composition was prepared in the same manner as in Example 1, except that the content of the catalyst was used at 30% relative to the content used in Example 1.

Comparative Example 2

A composition was prepared in the same manner as in Example 1, except that the content of the catalyst was used at a level of 3 times the content used in Example 1.

Comparative Example 3

A composition was prepared in the same manner as in Example 1, except that the repeating unit m in Formula 2 of the main composition was less than 1.

TABLE 1

|  |  |  | Catalyst amount | Viscosity (cP) | | |
|---|---|---|---|---|---|---|
|  |  |  | (relative amount) | V1 | V2 | V3 |
| Example | 1 | Urethane 1 | 100 | 200000 | 550000 | 5870000 |
|  | 2 | Urethane 1 | 100 | 490000 | 1400000 | 7800000 |
|  | 3 | Silicone | 100 | 220000 | 300000 | 6660000 |
| Comparative | 1 | Urethane 1 | 30 | 210000 | 250000 | 1500000 |
| Example | 2 | Urethane 1 | 300 | 510000 | 3000000< | 8030000 |
|  | 3 | Urethane 2 | 100 | 90000 | 270000 | 5200000 |

※ Considering the load of the viscosity measuring instrument, in case of exceeding 5,000,000 some error may occur.

TABLE 2

|  |  | Insulation performance | | Processability | |
|---|---|---|---|---|---|
|  |  | Sixty minute withstanding voltage | Dielectric breakdown voltage | (1) | (2) |
| Example | 1 | ○ | ○ | ○ | ○ |
|  | 2 | ○ | ○ | ○ | ○ |
|  | 3 | ○ | ○ | ○ | ○ |
| Comparative | 1 | X | X | ○ | X |
| Example | 2 | ○ | ○ | X | (not measurable) |
|  | 3 | ○ | ○ | X | (not measurable) |

From Tables 1 and 2 above, it can be seen that in Examples satisfying the viscosity-related conditions of the present application, excellent processability and insulation performance are realized, but in the case of Comparative Examples that the viscosity conditions are not satisfied, processability is poor. Specifically, it can be seen that when the V3 is too low due to insufficient curing as in Comparative Example 1, contamination of the adjacent components or peeling of the adhesive surface may occur, and when too much curing has been performed at the time of measuring V2 as in Comparative Example 2, the injection processability is poor. Then, in the case where the viscosity related to V1 is too low as in Comparative Example 3, the overflow is severely generated even before the curing progresses after the injection, and the injected composition does not form an evenly cured resin layer, while flowing from the upper part to the lower part in the gravity direction in the module, but is filled only in the lower part of the gravity direction, so that the upper part of the gravity direction can be unfilled.

The invention claimed is:

1. A resin composition having an initial viscosity change ratio defined by the following relational expression 1 in a range of 1.1 to 5.0, and
    having an initial viscosity change ratio defined by the following relational expression 2 of 10 or more,
    wherein in the following relational expressions 1 and 2, $V_1$ is in a range of 100,000 to 500,000 cP, $V_2$ is 2,000,000 cP or less, and $V_3$ is 5,000,000 cP or more:

Initial viscosity change ratio=$V_2/V_1$  [Relational Expression 1]

Initial viscosity change ratio=$V_3/V_1$  [Relational Expression 2]

wherein, $V_1$ is an initial viscosity, which is a viscosity value as measured at room temperature within 60 seconds after mixing main agent and curing agent of the resin composition, $V_2$ is a viscosity value measured after leaving the resin composition, in which $V_1$ has been measured, at room temperature for 5 minutes and $V_3$ is a viscosity value measured after leaving the resin composition, in which $V_1$ has been measured, at room temperature for 60 minutes, and when $V_1$ and $V_3$ are measured in a shear rate range of 0.01 to 10.0/s using a rheological property measuring device (ARES), they are viscosity values measured at a point of 2.5/s,
    wherein the resin composition is a urethane-based resin composition comprising,
    a main composition part comprising an ester-based polyol resin; a curing agent composition part comprising a polyisocyanate; and a filler, and
    the ester-based polyol resin is an amorphous polyol, in which a crystallization temperature (Tc) and a melting temperature (Tm) are not observed in a DSC (differential scanning calorimetry) analysis, or has a melting temperature (Tm) of less than 15° C.

2. The resin composition according to claim 1, wherein a dielectric breakdown voltage of a cured product measured 24 hours after mixing the main agent and the curing agent is 10 kV/mm or more.

3. The resin composition according to claim 1, wherein a mixture of the ester-based polyol resin and polyisocyanate has a glass transition temperature (Tg) of less than 0° C. after curing.

4. The resin composition according to claim 1, wherein each of the ester-based polyol resin and the polyisocyanate has a viscosity of less than 10,000 cP.

5. The resin composition according to claim 1, wherein the ester-based polyol resin is represented by the following formula 1 or 2:

[Formula 1]

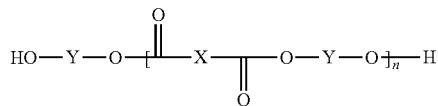

[Formula 2]

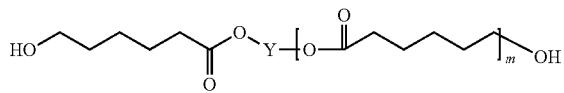

wherein, X is a carboxylic acid-derived unit, Y is a polyol-derived unit, n is a number within a range of 2 to 10, and m is a number within a range of 1 to 10.

6. The resin composition according to claim 5, wherein the carboxylic acid-derived unit X is one or more units selected from the group consisting of a phthalic acid unit, an isophthalic acid unit, a terephthalic acid unit, a trimellitic acid unit, a tetrahydrophthalic acid unit, a hexahydrophthalic acid unit, a tetrachlorophthalic acid unit, an oxalic acid unit, an adipic acid unit, an azelaic acid unit, a sebacic acid unit, a succinic acid unit, a malic acid unit, a glutaric acid unit, a malonic acid unit, a pimelic acid unit, a suberic acid unit, a 2,2-dimethylsuccinic acid unit, a 3,3-dimethylglutaric acid unit, a 2,2-dimethylglutaric acid unit, a maleic acid unit, a fumaric acid unit, an itaconic acid unit and a fatty acid unit.

7. The resin composition according to claim 5, wherein the polyol-derived unit Y is any one or two or more units selected from the group consisting of an ethylene glycol unit, a propylene glycol unit, a 1,2-butylene glycol unit, a 2,3-butylene glycol unit, a 1,3-propanediol unit, a 1,3-butanediol unit, a 1,4-butanediol unit, a 1,6-hexanediol unit, a neopentyl glycol unit, a 1,2-ethylhexyldiol unit, a 1,5-pentanediol unit, a 1,9-nonanediol unit, a 1,10-decanediol unit, a 1,3-cyclohexanedimethanol unit, a 1,4-cyclohexanedimethanol unit, a glycerin unit and a trimethylolpropane unit.

8. The resin composition according to claim 1, wherein the polyisocyanate is a non-aromatic polyisocyanate.

9. The resin composition according to claim 8, wherein the non-aromatic polyisocyanate is an alicyclic polyisocyanate, a carbodiimide-modified alicyclic polyisocyanate, or an isocyanurate-modified alicyclic polyisocyanate.

10. The resin composition according to claim 1, wherein the filler comprises alumina, AlN (aluminum nitride), BN (boron nitride), silicon nitride, SiC, or BeO.

11. The resin composition according to claim 1, wherein the filler is contained in an amount of 50 to 2,000 parts by weight relative to 100 parts by weight of the sum of the ester-based polyol resin and polyisocyanate contents.

12. A battery module comprising a module case having a top plate, a bottom plate and sidewalls, wherein an inner space is formed by the top plate, the bottom plate, and the sidewalls;
    a plurality of battery cells existing in the inner space of the module case; and
    a resin layer formed by curing the resin composition according to claim 1 and in contact with the plurality of battery cells.

13. A battery pack comprising one or more battery modules according to claim 12.

14. An automobile comprising the battery module according to claim 12.

15. A method of manufacturing a battery module, comprising injecting the resin composition according to claim 1 into a module case; housing a battery cell in the module case, and curing the resin composition to form the resin layer.

16. The method of manufacturing a battery module according to claim 15, wherein the curing of the resin composition is performed by holding the resin composition at room temperature or heating at a temperature in a range of about 30° C. to 50° C. for a predetermined time.

* * * * *